US012761154B2

(12) United States Patent
Stimpson

(10) Patent No.: US 12,761,154 B2
(45) Date of Patent: Oct. 13, 2026

(54) OPTICAL APPARATUS

(71) Applicant: RENISHAW PLC, Wotton-under-Edge (GB)

(72) Inventor: Victor Gordon Stimpson, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 117 days.

(21) Appl. No.: 18/838,738

(22) PCT Filed: Mar. 1, 2023

(86) PCT No.: PCT/GB2023/050458
§ 371 (c)(1),
(2) Date: Aug. 15, 2024

(87) PCT Pub. No.: WO2023/170383
PCT Pub. Date: Sep. 14, 2023

(65) Prior Publication Data

US 2025/0137932 A1 May 1, 2025

(30) Foreign Application Priority Data

Mar. 9, 2022 (GB) ..................................... 2203238

(51) Int. Cl.
*G01N 21/65* (2006.01)

(52) U.S. Cl.
CPC .................................... *G01N 21/65* (2013.01)

(58) Field of Classification Search
CPC ............. G01N 21/65; G01N 2021/656; G01N 23/2254; H01J 37/228; H01J 37/023
(Continued)

(56) References Cited

U.S. PATENT DOCUMENTS 9,564,291 B1 * 2/2017 Own ....................... C23C 14/24
9,894,254 B2 * 2/2018 Heshmat Dehkordi ..................... H04N 23/57
(Continued)

FOREIGN PATENT DOCUMENTS

EP 3 570 311 A1 11/2019
GB 2 481 726 A 1/2012
(Continued)

OTHER PUBLICATIONS

Aug. 29, 2023 Search Report issued in International Patent Application No. PCT/GB2023/050458.
(Continued)

*Primary Examiner* — Isiaka O Akanbi
(74) *Attorney, Agent, or Firm* — Oliff PLC

(57) ABSTRACT

An optical apparatus with an analytical apparatus can project an analysis beam along an analytical axis towards a sample within a chamber. The optical apparatus includes a collection optic mounted on an arm, the arm inserted into the sample chamber through a port therein. The arm is inserted into the sample chamber locating the collection optic for directing light scattered or generated from a point on the sample. A drive mechanism external to the sample chamber moves the collection optic within the sample chamber in at least two transverse directions. The drive mechanism inserts the arm into the sample chamber locating the collection optic for directing the light out of the sample chamber. The optical apparatus further includes a delivery optical train for delivering illumination or excitation light from a light source to the collection optic such that the illumination or excitation light is incident on the sample.

26 Claims, 6 Drawing Sheets

(58) Field of Classification Search
USPC .......... 356/318, 333, 326, 328, 301, 334, 73
See application file for complete search history.

(56) References Cited

U.S. PATENT DOCUMENTS

| | | | | |
|---|---|---|---|---|
| 10,707,051 | B2 | 7/2020 | Hunt et al. | |
| 2003/0053048 | A1* | 3/2003 | Bennett | G01J 3/02 356/301 |
| 2005/0193576 | A1 | 9/2005 | Hollman et al. | |
| 2007/0023655 | A1* | 2/2007 | Nishikata | H01J 37/244 250/310 |
| 2007/0291254 | A1* | 12/2007 | Wolf | G01J 3/4406 356/417 |
| 2008/0185509 | A1* | 8/2008 | Knowles | H01J 37/256 250/251 |
| 2011/0261354 | A1* | 10/2011 | Sinfield | G01J 3/021 356/301 |
| 2013/0063714 | A1* | 3/2013 | Izzia | G01J 3/44 356/51 |
| 2013/0068966 | A1* | 3/2013 | Kociak | H01J 37/244 250/458.1 |
| 2013/0087706 | A1 | 4/2013 | Kociak et al. | |
| 2015/0076364 | A1* | 3/2015 | Kociak | H01J 37/244 250/216 |
| 2019/0348257 | A1 | 11/2019 | Hunt et al. | |
| 2023/0258918 | A1* | 8/2023 | Patra | G02B 21/365 348/79 |

FOREIGN PATENT DOCUMENTS

| | | | |
|---|---|---|---|
| WO | 99/058939 | A1 | 11/1999 |
| WO | 03/014794 | A1 | 2/2003 |

OTHER PUBLICATIONS

Aug. 29, 2023 Written Opinion of the International Searching Authority issued in International Patent Application No. PCT/GB2023/050458.

May 19, 2022 Search Report issued in British Patent Application No. GB2203238.7.

* cited by examiner

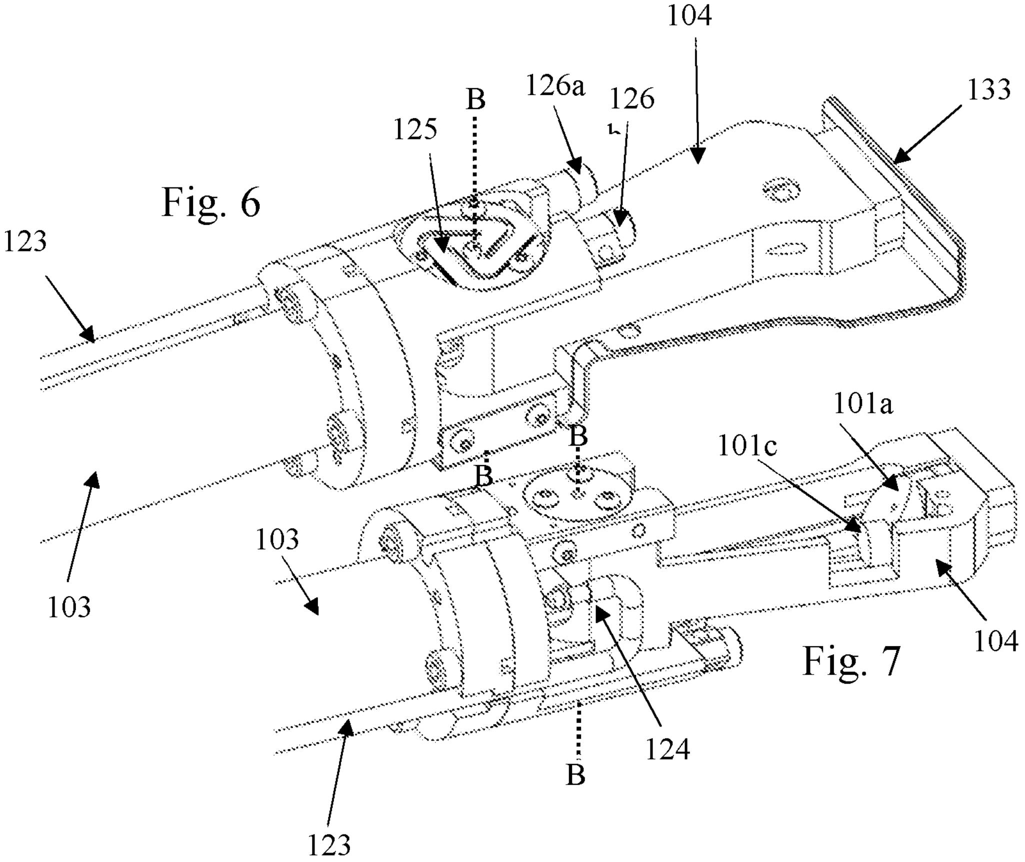
Fig. 6
Fig. 7
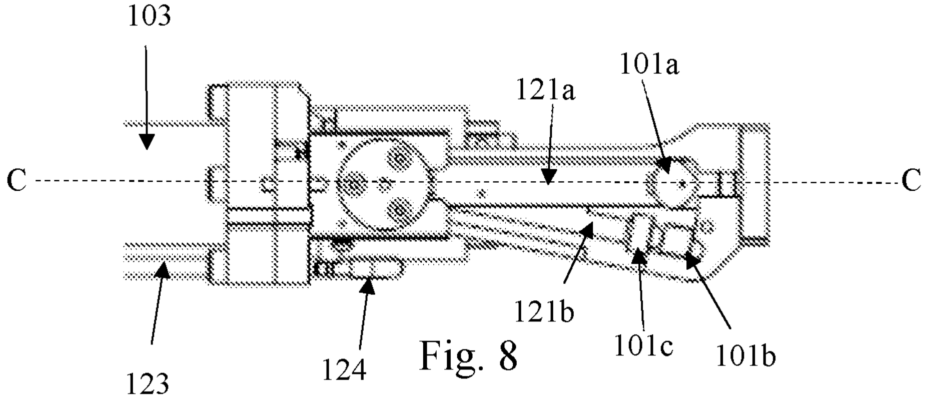
Fig. 8

OPTICAL APPARATUS

FIELD OF INVENTION

This invention concerns optical apparatus for delivering light scattered or generated from a point on the sample in a sample chamber, such as a vacuum chamber, of an analytical apparatus to a detector outside of the sample chamber. The analytical apparatus may be arranged to project an analysis beam, such as an electron beam, along an analytical axis towards a sample. The analytical apparatus may comprise an electron microscope. The optical apparatus may be an adapter arranged to be retrofitted to the analytical apparatus. The optical apparatus may be for carrying out spectroscopy, such as Raman spectroscopy.

BACKGROUND

International Patent Application No. WO99/58939 discloses an analytical system for a scanning electron microscope that projects a beam of electrons along an analytical axis onto a sample. A parabolic mirror is mounted generally in the analytical axis above the sample and an aperture in the mirror allows the electron beam to pass through to the sample. The mirror is mounted on a mirror holder assembly which has an optical axis generally transverse to the analytical axis. The mirror holder assembly may retract the mirror between its operative position and an inoperative position away from the analytical axis.

International Patent Application No. WO03/014794A discloses an electron microscope combined with a spectroscopy system. A parabolic mirror is mounted on a mirror holder. The mirror holder is mounted to a retraction arm that is capable of moving the parabolic mirror between an operative position and an inoperative position. The retraction arm is mounted on guide rails and may be wound in or out along the guide rails by a retraction screw, which may be motor driven. The guide rails and retraction screw are located external to the vacuum to the electron microscope chamber.

It is desirable to carry out spectroscopy at a plurality of points on a sample in an electron microscope, which may be referred to as mapping, with the optical axis of the spectroscopy system substantially coaxial with the electron beam. Furthermore, it is desirable for such a spectroscopy system to be retrofittable to multiple types of electron microscopes. It is unusual for a customer to buy spectroscopy apparatus at the same time as purchasing an electron microscope. Hence, a customer may only consider whether or not the electron microscope can be combined with spectroscopy apparatus after acquiring the electron microscope. Spectroscopy apparatus limited to use with one or only a few electron microscopes limits the size of the market for such an apparatus. To reduce the need to provide multiple software modules for the spectroscopy system and constant adaptation of the software with changes in electron microscope control software, it is desirable for a retrofittable spectroscopy apparatus to be able to carry out mapping of the sample in the vacuum chamber without interfacing with the electron microscope. In this way, the need to provide a control system of the spectroscopy apparatus compatible with each different type of electron microscope is avoided.

SUMMARY OF INVENTION

According to a first aspect of the invention there is provided an optical apparatus for use with an analytical apparatus arranged to project an analysis beam along an analytical axis towards a sample within a sample chamber, the optical apparatus comprising a collection optic mounted on an arm, the arm insertable or inserted into the sample chamber through a port in the sample chamber, wherein the arm is insertable or inserted into the sample chamber to locate the collection optic for directing light scattered or generated from a point on the sample out of the sample chamber.

The optical apparatus may comprise a sealing element for sealing the port. The sealing element may comprise a window, wherein the arm is insertable or inserted into the sample chamber to locate the collection optic for directing light scattered or generated from the point on the sample out of the sample chamber through the window. In this way, the port in the sample chamber is sealed when the arm is inserted into the sample chamber. This may enable a controlled atmosphere such as a vacuum to be maintained in the sample chamber.

The optical apparatus may comprise a drive mechanism for moving the collection optic within the sample chamber. The drive mechanism may be arranged to move the collection optic in at least two transverse directions (e.g. translation (linear motion) of the collection optic in the at least two transverse directions). The drive mechanism may be arranged such that when the arm is inserted into the sample chamber to locate the collection optic for directing the light, the collection optic is movable in two transverse directions substantially perpendicular to the analytical axis. In this way, the collection optic can direct light scattered or generated from a plurality of different points on the sample. Hence, a two-dimensional mapping of the sample can be carried out by moving the collection optic within the sample chamber and not the sample. This avoids a need for the optical apparatus to communicate with the analytical apparatus to cause movement of a sample holder to move the sample. Accordingly, the optical delivery apparatus may be arranged to move the collection optic to direct light scattered or generated from a plurality of different points on the sample with the sample located on the analytical axis. In this way, spectroscopic imaging/mapping of the sample using the light can be carried out when the sample is under the analytical beam.

The drive mechanism may be arranged to move the arm, wherein movement of the arm causes movement of the collection optic. The drive mechanism may be arranged to move the arm in the at least two transverse directions, and preferably at least two orthogonal directions. The drive mechanism may comprise a translation mechanism for translating the arm. Translation of the arm may cause translation of the collection optic. The drive mechanism may comprise a cartesian coordinate manipulator arranged for moving the arm in the at least two different transverse directions, and preferably three different transverse, and preferably orthogonal, directions.

The drive mechanism may comprise actuators for actuating movement of the collection optic, and optionally the arm, in the at least two transverse directions.

The drive mechanism may be arranged such that when the arm is inserted into the sample chamber to locate the collection optic for directing the light, the drive mechanism is located external to the sample chamber. In this way, the translation mechanism and/or the actuators used are not limited to types that are suitable for use in the atmosphere formed in the sample chamber, such as a vacuum. For example, the translation mechanism and/or the actuators may use lubrication that is unsuitable for use in a vacuum, for example because, if used in a vacuum, the lubrication would contaminate the vacuum. The term vacuum as used herein means an atmosphere in which the pressure is significantly lower than atmospheric pressure, such as less than 3 Pa.

The drive mechanism may comprise a first linear axis substantially parallel to a longitudinal axis of the arm. The drive mechanism may be arranged such that a range of movement along the first linear axis is sufficient to withdraw the collection optic out of the path of the analytical beam. The drive mechanism may be arranged such that a range of movement along the first linear axis is sufficient to withdraw all parts of the optical device out of the path of the analytical beam. In this way, other instruments can be inserted into the analytical beam from other ports in the sample chamber. The drive mechanism may comprise a second linear axis transverse to the first linear axis. The extent of movement along the first linear axis may be greater than an extent of movement along the second linear axis. The drive mechanism may comprise a third linear axis transverse to the first and second linear axis. The extent of movement along the first linear axis may be greater than an extent of movement along the third linear axis. Movement along the second and third linear axis may need to be sufficient for mapping only, whereas movement along the first linear axis may be for mapping and withdrawal of the optical apparatus from the analytical axis.

The collection optic may have an aperture therein for allowing the analytical beam to pass therethrough. The collection optic may be a mirror, such as a parabolic mirror. During mapping, the collection optic may be arranged to be held stationary relative to the arm. In one embodiment, the collection optic is fixed relative to the arm. The arm may be arranged to extend through a port in the sample chamber. The arm may be arranged to move relative to the port through which it extends.

The arm may comprise a tube and the collection optic is arranged to direct the light along the tube. It will be understood that the term "tube" as used herein is not limited to a hollow cylinder, but other hollow shapes could be used, such as shapes having a polygonal cross-section. Preferably the tube is a hollow cylindrical tube. A tube, in particular a hollow cylindrical tube, provides a rigid structure for supporting the collection optic.

The sealing element may comprise a flange for sealing a port to the sample chamber. The flange may comprise an aperture through which the light is directed by the collection optic. The arm may be mounted to be movable relative to the flange within the aperture. The aperture may be sealed by the window fixed to the arm and a seal that seals a portion of the aperture between the window and the flange. The seal may comprise the tube and a hermetic seal that prevents air passing through the aperture between the tube and the flange. The hermetic seal may be an extendible element, such as bellows, attached around an outside of the tube and to the flange around the aperture. The window may be mounted in or on a distal end of the tube to be located in the sample chamber. Accordingly, the majority, if not the entire, volume inside the tube is sealed from the sample chamber (and, in use, would be at ambient/atmospheric pressure). The window acts as a barrier dividing elements of the optical apparatus that, in use, are exposed to air ("air-side") and elements that, in use, are exposed to the atmosphere, such as a vacuum, in the sample chamber ("sample chamber side").

The optical apparatus may comprise a detection optical train for delivering the light that has passed through the window to a photodetector. For example, the optical train may be arranged to deliver the light to an optical fibre. The optical fibre may be connectable to a spectrometer, such as a Raman spectrometer, for analysing the light. The optical apparatus may comprise at least one photodetector for detecting the light. The optical apparatus may comprise a plurality of photodetectors in a one-dimensional or two-dimensional array. The optical apparatus may comprise a CCD detector or CMOS detector.

The optical apparatus may comprise a delivery optical train for delivering illumination or excitation light from a light source, such as a laser or white light source, to the collection optic such that the illumination or excitation light is incident on the sample. The optical apparatus may comprise a plurality of delivery optical trains, each delivery optical train for delivering light from a different light source to the collection optic or a corresponding collection optic. The optical apparatus may comprise at least two collection optics, one for directing laser light on to the sample, for example for spectroscopy, and another for directing incoherent light onto the sample, for example for illuminating the sample for imaging. The collection optic may comprise a parabolic mirror. A parabolic mirror may be suitable for directing a laser beam to the sample and directing light scattered from or generated by the sample at the point irradiated by the laser beam along the arm. The collection optic may comprise a planar mirror, and optionally a lens. The planar lens may be suitable for imaging the sample. The at least two collection optics may comprise the parabolic mirror and the planar mirror.

Each optical train may share some, but not all, optical components with another of the optical trains, which may be achieved using a beam splitter or one or more movable optical elements that can be inserted into a beam path(s) of the light source(s). The optical trains may be arranged to direct light from each light source along a common optical path. The common optical path may include an optical path along the arm, such as through the tube. In this way, the width of the tube can be smaller than that which would be required to carry multiple, non-coincidental optical paths. It may be desirable to minimise a width of the arm in order to maximise the range of movement of the arm within the port.

The optical apparatus may comprise a collection optic interchange device for changing the collection optic in the common optical path. The collection optic interchange system may comprise a holder on which the collection optics are mounted, the holder arranged to be movable relative to the optical path to locate each collection optic in the common optical path. The holder may be mounted to the arm, preferably the distal end of the arm. The holder may be rotatably mounted on the arm such that the holder can be rotated to a plurality of different positions, each position corresponding to a different one of the collection optics being located in the optical path. The collection optic interchange device may comprise an actuator for moving the holder. The actuator may be arranged at a location in the optical apparatus such that the actuator is located outside the sample chamber when, in use, the holder is located in the sample chamber and a transmission linkage for transmitting movement of the actuator outside the sample chamber to movement of the holder within the sample chamber. The transmission linkage may convert rotational movement about or linear movement along an axis substantially parallel to the common optical path to movement of the holder transverse to the common optical path.

The optical apparatus may comprise the light source(s).

The drive mechanism may comprise a drive control system for limiting movement of the arm to a specified range, the drive control system programmable to adjust the specified range. The drive mechanism may comprise encoders for measuring a position of the or each axis of the drive mechanism. The drive control system may limit an extent of movement of the arm based on the specified range and position measurements generated by the encoders. The encoders may be absolute position encoders. The absolute position encoder obtains a position of the drive mechanism without a need to move to a reference position. In this way, the optical apparatus can be adapted to different analytical apparatus having different geometric arrangements within the sample chamber such that collisions of the arm with other components in the sample chamber are avoided (so called "geofencing").

The optical apparatus may comprise a brake for holding the drive mechanism against forces on the arm resulting from a difference in pressure between the atmosphere within the sample chamber and atmosphere external to the sample chamber. For example, in use, a vacuum may be formed in the sample chamber such that, without a force being applied to the arm, the arm would be forced into the sample chamber by the difference in pressure between the external atmosphere and the vacuum. The brake may maintain a position of the arm against a force resulting from the difference in pressure when power is not applied to the actuator(s), for example when there is a loss of power or to avoid a need to constantly apply power to the actuator(s). Accordingly, the brake may be (in normal operation) on when no power is applied.

The optical apparatus may comprise a pressure sensor for measuring the pressure in the sample chamber. For example, the pressure sensor may be arranged to measure the pressure in the extendible seal, such as the bellows, or on the sample chamber side of the flange. The optical apparatus may comprise a light source control system configured to cause at least one light source, such as a laser, to be switched off (or lowered in intensity) if the measured pressure in the sample chamber deviates from a pre-set operating pressure. For example, the light source control system configured to cause at least one light source, such as a laser, to be switched off (or lowered in intensity) if the measured pressure in the sample chamber is substantially the same as the external pressure. The pressure sensor may measure a difference between the pressure in the sample chamber and pressure external to the sample chamber and the light source control system is configured to cause at least one light source, such as a laser, to be switched off (or lowered in intensity) if the measured difference is substantially zero. In this way, if a user opens a door to the sample chamber, the light source, such as the laser beam, is switched off or lowered in intensity such that exposure of the user to potentially damaging light, such as high intensity laser light, is avoided. This avoids configuring of control system(s) of the optical apparatus to communicate with control systems of the analytical apparatus to determine when a door to the sample chamber is opened.

According to a second aspect of the invention there is provided a method of collecting light scattered or generated from a sample in sample chamber of an analytical apparatus, the analytical apparatus arranged to project an analysis beam along an analytical axis towards the sample within the sample chamber, the method comprising operating one or more actuators external to the sample chamber to move a collection optic within the sample chamber such that the collection optic directs light from different points on the sample for each of a plurality of positions of the collection optic in the sample chamber.

According to a third aspect of the invention there is provided a method of collecting light scattered or generated from a sample in sample chamber of an analytical apparatus, the analytical apparatus arranged to project an analysis beam along an analytical axis towards the sample within the sample chamber, the method comprising operating one or more actuators external to the sample chamber to change which one of a plurality of collection optics in the sample chamber is located at a position in the sample chamber in which the collection optic directs light scattered or generated from a sample through a window and out of the sample chamber.

According to a third aspect of the invention there is provided a probe for use with a sample chamber, the probe comprising a probing element mounted on an arm, the arm insertable or inserted into the sample chamber to locate the probing element within the sample chamber, a drive mechanism for moving the arm, wherein movement of the arm causes movement of the probing element within the sample chamber, and a drive control system for limiting movement of the arm to a specified range, the drive control system programmable to adjust the specified range.

The drive mechanism may comprise encoders for measuring a position of the or each axis of the drive mechanism. The drive control system may limit an extent of movement of the arm based on the specified range and position measurements generated by the encoders. The encoders may be absolute position encoders. In this way, the probe can be adapted to different sample chambers having different geometric arrangements within the sample chamber such that collisions of the arm with other components in the sample chamber are avoided (so called "geofencing").

According to a fourth object of the invention there is provided a probe for use with a sample chamber, the sample chamber arranged to maintain an internal atmosphere at a different pressure to an external atmosphere, the probe comprising a probing element mounted on an arm, the arm insertable or inserted into the sample chamber to locate the probing element within the sample chamber, a drive mechanism for moving the arm, wherein movement of the arm causes movement of the probing element within the sample chamber and a brake for holding the drive mechanism against forces on the arm resulting from the difference in pressure between the internal atmosphere and the external atmosphere.

The brake may be arranged to hold the drive mechanism when no power is applied to the probe.

According to a fifth aspect of the invention there is provided an adapter for retrofitting to a sample chamber arranged to maintain an internal atmosphere at a pressure different to an external atmosphere, the adapter comprising a light source and a delivery optic mounted on an arm, the arm insertable into the sample chamber to locate the optic for directing light generated by the light source to a target in the sample chamber, a pressure sensor for measuring the pressure in the sample chamber and a light source control system configured to cause the light source to be switched off if the measured pressure as measured by the pressure sensor deviates from a pre-set operating pressure.

The light source control system may be configured to cause the light source to be switched off if the measured pressure in the sample chamber is substantially the same as the external pressure. The pressure sensor may measure a difference between the pressure in the sample chamber and pressure external to the sample chamber and if the measured difference is substantially zero, the light source control system is configured to cause the light source to be switched off.

The light source may be a laser.

DESCRIPTION OF EMBODIMENTS

FIG. 6 is a perspective view of a distal end of an arm and a collection optics holder of the optical apparatus viewed from above;

FIG. 7 is a perspective view of the distal end of the arm, the collection optics holder and the collection optics viewed from below;

FIG. 8 is a plan view of the distal end of the arm, the collection optics holder and the collection optics viewed from below;

DESCRIPTION OF EMBODIMENTS

Figure 1:
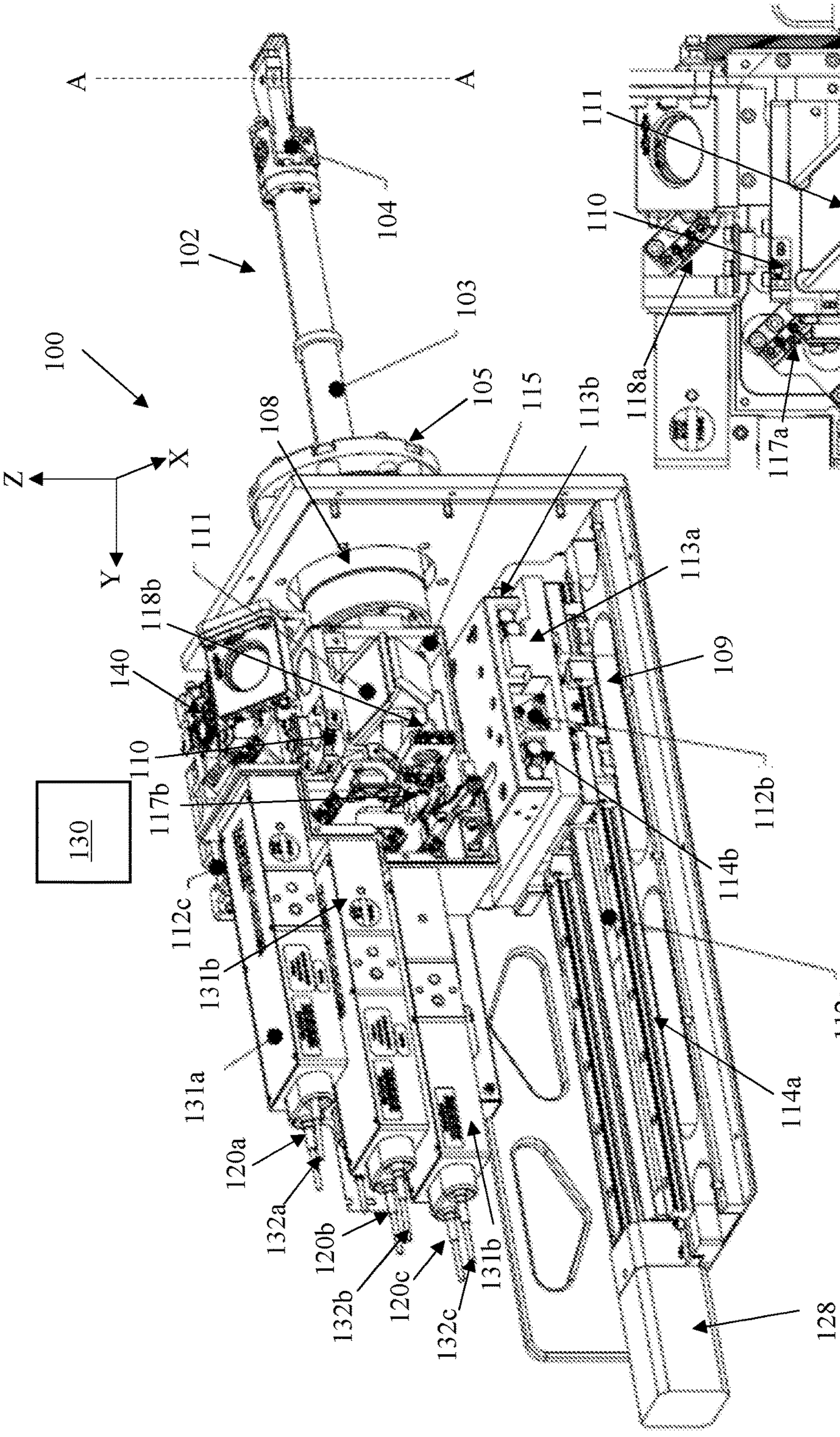
FIG. 1 is a perspective view of an optical apparatus according to an embodiment of the invention.
Figure 2:
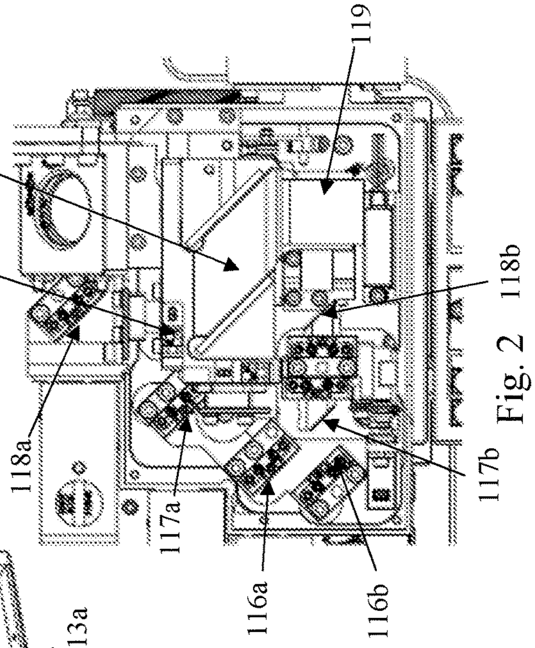
FIG. 2 is a side view of the optical apparatus shown in FIG. 1.
Figure 3:
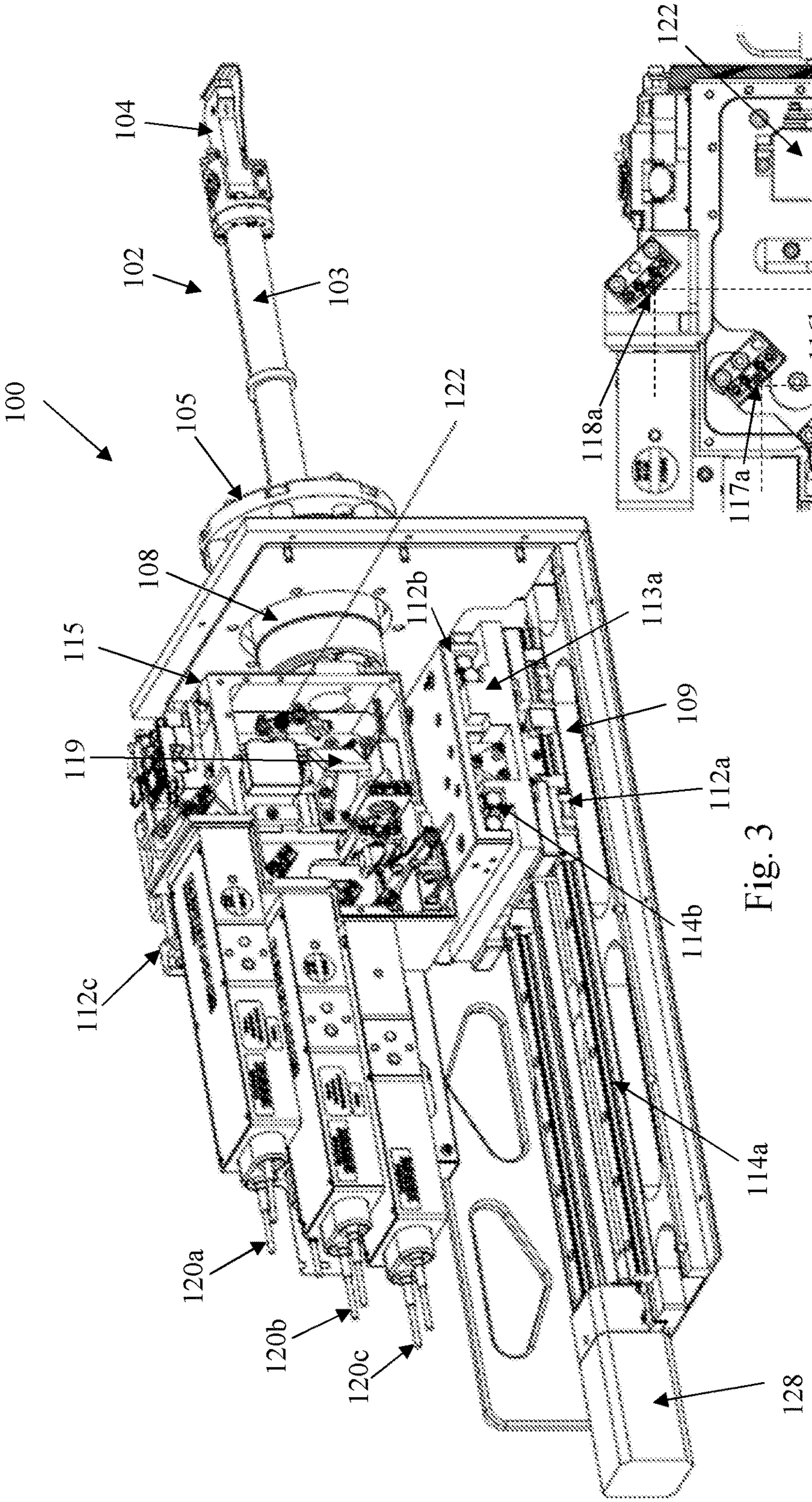
FIG. 3 is a perspective view of the optical apparatus shown in FIGS. 1 and 2, with components removed to show an actuator for moving the collection optics holder.
Figure 4:
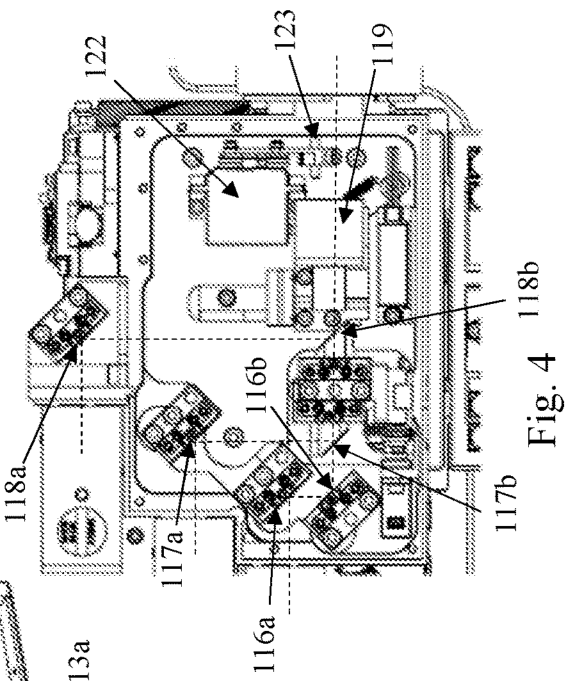
FIG. 4 is a side view of an optical apparatus shown in FIGS. 1 to 3, with components removed to show an actuator for moving the collection optics holder.
Figure 5:
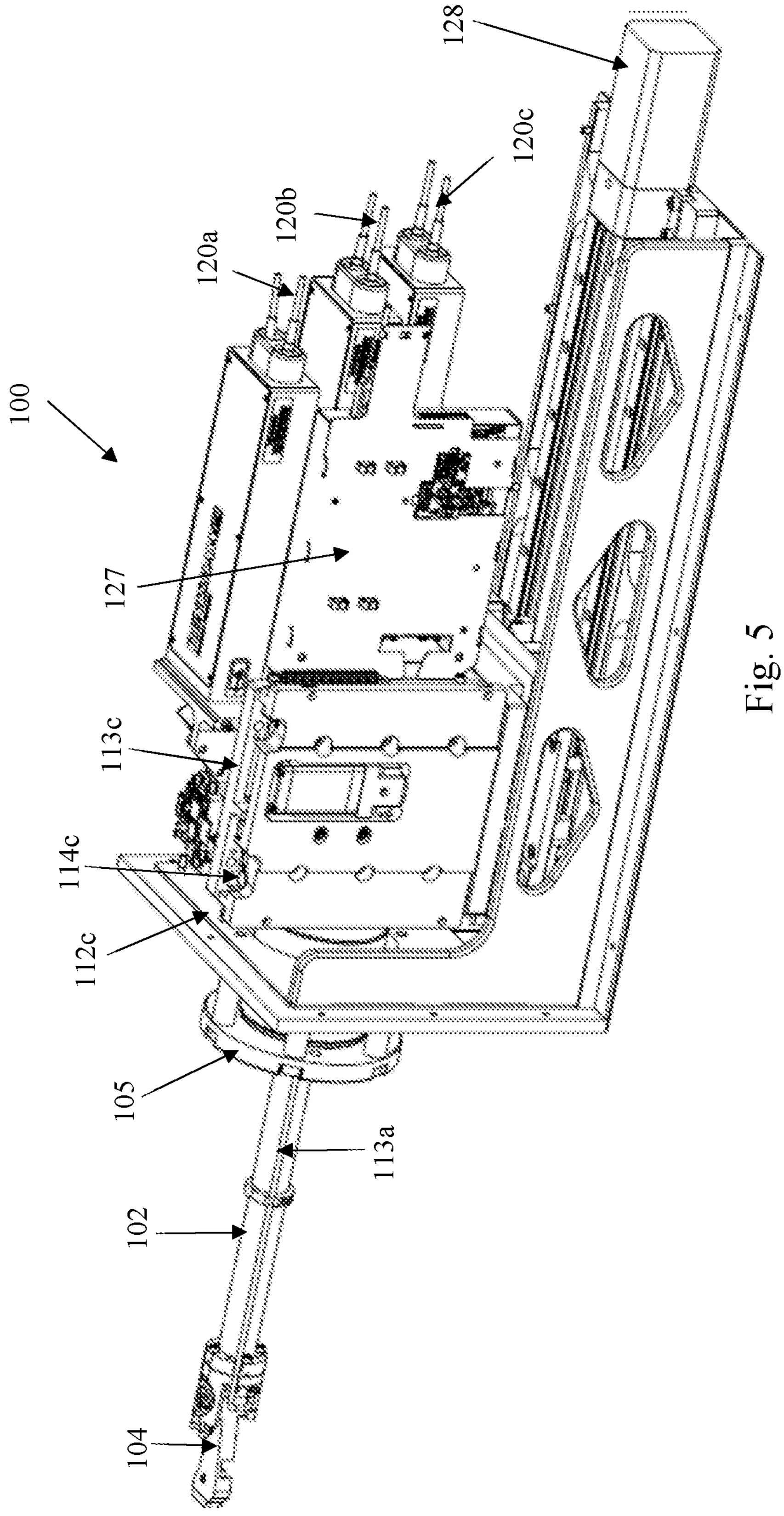
FIG. 5 is a perspective view of the optical apparatus shown in FIGS. 1 to 4 from a different viewpoint.
Figure 9:
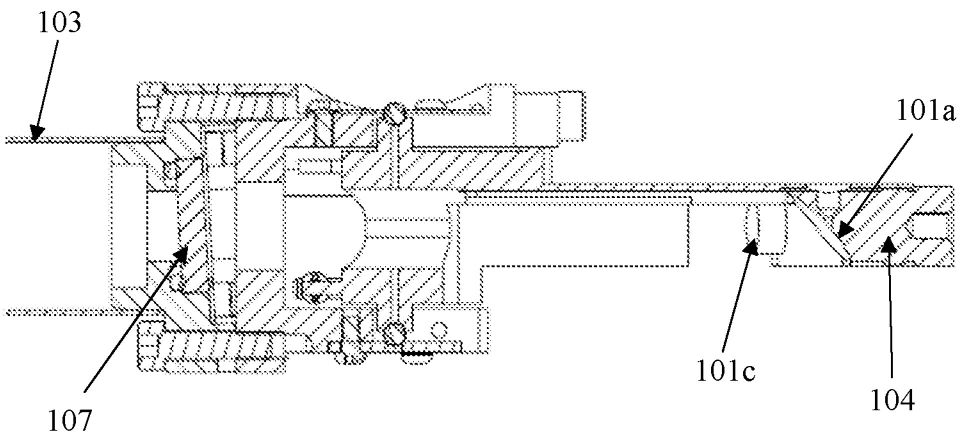
FIG. 9 is a cross-sectional view of the distal end of the arm, the collection optics holder and the collection optics along the line C-C shown in FIG. 8.
Figure 10:
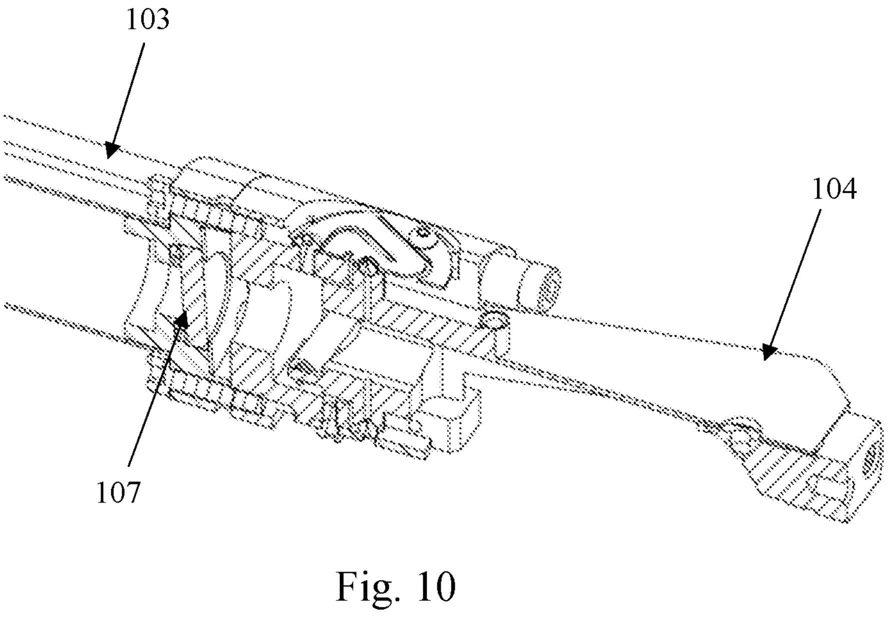
FIG. 10 is a cutaway view of the distal end of the arm, the collection optics holder and the collection optics.
Figure 11:
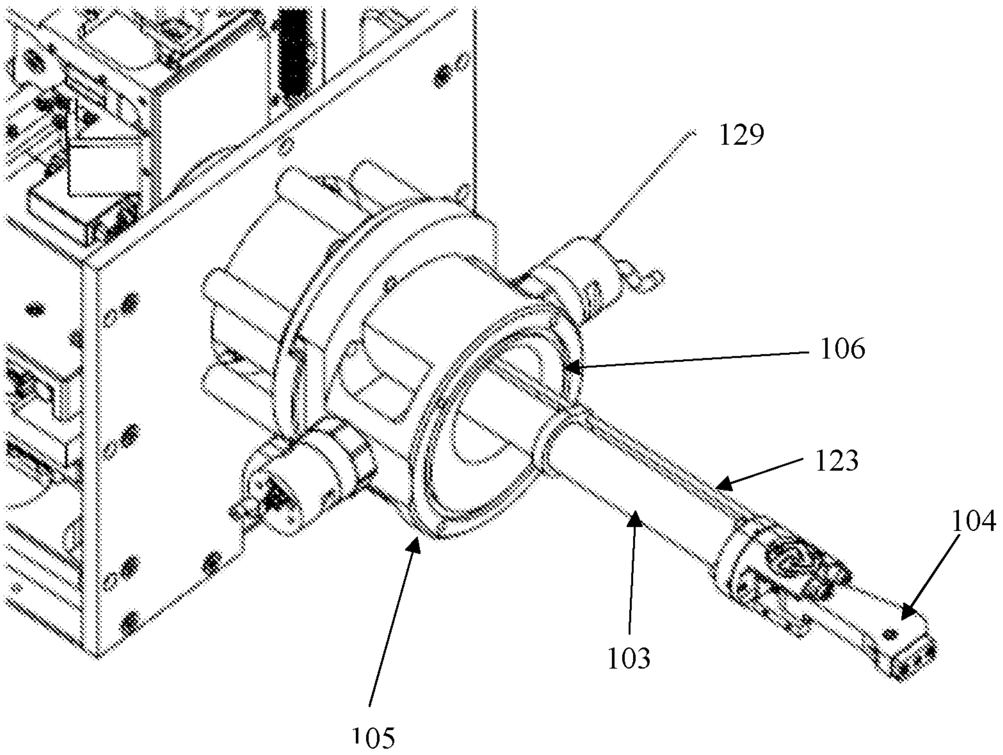
FIG. 11 is a perspective view of a flange of the optical apparatus.

FIGS. 1 to 8 show an optical apparatus 100 for use with an electron beam microscope, in which an electron beam is projected along an analytical axis A towards a sample within a sample chamber. The optical apparatus 100 comprises collection optics 101*a*, 101*b* mounted in a movable holder 104 on a distal end of an arm 102, the arm 102 insertable into the sample chamber through a port to locate the collection optics 101*a*, 101*b* for directing light scattered or generated from a point on the sample along the arm 102. In this embodiment, the arm 102 comprises a cylindrical tube 103 and the collection optic 101*a*, 101*b* can be positioned by holder 104 to direct the light along the inside of tube 103.

A flange 105 is provided for sealing a port to the sample chamber through which the arm 102 is inserted. The flange 105 has bolts or other fasteners for securing the flange 105 to the sample chamber. This fixing alone may be sufficient to hold the optical apparatus in place, with the optical apparatus cantilevered off a side of the sample chamber. In another embodiment, the optical apparatus may be additionally supported from below, for example by a bench. The flange 105 comprises an aperture 106 through which the arm 102 extends, the arm movable relative to the flange 105. The aperture 106 is sealed by a window 107 optically transparent to the light fixed to a distal end of the tube 103 and an extendible sealing element that seals the portion of the aperture 106 between the window 107 and the flange 105. In this embodiment, the sealing element comprises the tube 103 and a bellows 108 that prevents air passing through the aperture 106 between the tube 103 and the flange 105. The bellows 108 is attached around an outside of the tube 103 and to the flange 105 around the aperture 106.

Collection optic 101*a* is for carrying out spectroscopy and has an aperture therein for allowing the electron beam to pass therethrough. A drive mechanism 109 is provided for moving arm 102, and thus the collection optics 101*a*, 101*b* mounted to the arm 102, within the sample chamber.

The drive mechanism 109 is arranged to move the arm 102 in three orthogonal directions using linear translation stages 112*a*, 112*b*, 112*c*. Each stage 112*a*, 112*b*, 112*c* comprises carriages 113*a*, 113*b*, 113*c* mounted on rails 114*a*, 114*b*, 114*c*. Actuators (not shown) are provided for moving the carriages 113*a*, 113*b*, 113*c* on the rails 114*a*, 114*b*, 114*c*. The drive mechanism 109 is arranged on an "air-side" of the flange 105 such that when the arm 102 is inserted into the sample chamber to locate the collection optic 101*a*, 110*b* for directing the light, the drive mechanism 109 is located external to the sample chamber. In this way, the translation stages 112*a*, 112*b*, 112*c* and/or the actuators used are not limited to types that are suitable for use in the vacuum formed in the sample chamber. For example, the translation stages 112*a*, 112*b*, 112*c* and/or the actuators may use lubrication that is unsuitable for use in a vacuum, for example because, if used in a vacuum, the lubrication would contaminate the vacuum.

Translation stage 112*a* moves the arm 102 in a direction (labelled the "Y-axis") parallel to a longitudinal axis of the arm 102. Translation stage 112*b* is mounted on carriage 113*a* and moves the arm 102 is a direction (labelled the "X-axis") perpendicular to the longitudinal axis of the arm 102 and perpendicular to the analytical beam. Translation stage 112*c* is mounted on carriage 113*b* and moves the arm 102 is a direction (labelled the "Z-axis") perpendicular to the longitudinal axis of the arm 102 and parallel to the analytical beam. The rails 114*a* on the Y-axis translation stage 112*a* are longer than the rails 114*b*, 114*c* of the other translation stages 112*b*, 112*c* because the Y-axis translation state 112*a* is not just used for mapping of the sample but also for withdrawing the optical apparatus from the location coinciding with the electron beam such that other devices can be inserted to this position.

The optical apparatus comprises an integrated motor and brake 128. The motor (actuator) drives movement along the Y-axis and the brake is arranged to hold the Y-axis translation stage 112*a* against forces on the arm 102 resulting from a difference in pressure between the vacuum within the sample chamber and atmosphere external to the sample chamber. The brake 128 maintains a position of the Y-axis translation stage 112*a* when power is not applied to the motor of the Y-axis translation stage, for example when there is a loss of power or to avoid a need to constantly apply power to the motor. Accordingly, the brake 128 is ordinarily on when no power is applied.

The drive mechanism 109 comprises a drive control system 127 that controls the operation of the translation stages 112*a*, 112*b*, 112*c*. The drive mechanism 109 comprises encoders (not shown) for measuring a position of each translation stage 112*a*, 112*b*, 112*c*. In this embodiment, the encoders are absolute position encoders.

The position measurement signals from the encoders are sent to the drive control system 127. The drive control system 127 is programmable with limits of movement for each translation stage 112*a*, 112*b*, 112*c*. These limits may be programmed by an installation engineer, who mounts (retrofits) the optical apparatus to an electron microscope, based on the internal geometry of the sample chamber of the electron microscope. The drive control system 127 controls movement of the translation stages 112*a*, 112*b*, 112*c* to Raman map the sample based on feedback from the encoders. The control system 127 stops further movement of the translation stages 112*a*, 112*b*, 112*c* in a direction if the position measured by the corresponding encoder corresponds to a programmed limit.

Mounted on the Z-axis carriage 112*c* is a mirror box 115 housing three pairs of mirrors 116*a*, 116*b*; 117*a*, 117*b*; and 118*a*, 118*b*, each pair of mirrors aligned for delivering a corresponding laser beam from a laser source, in this embodiment Raman probes 131*a*, 131*b*, 131*c*, along a common optical path through tube 103 to a collection optic 101*a*, 101*b*. Mirrors 116*a*, 116*b*, 117*a* and 118*a* are fixed in place in the mirror box 115. Mirrors 117*b* and 118*b* are movable from a position aligned to delivery the corresponding laser beam (indicated by the dotted lines) along the common optical path to a position out of the optical path of the other laser beam(s) (movable mirror 117*b* moving into the path of the laser beam directed by mirrors 116*a* and 116*b* and mirror 118*b* moving into the path of both of the other laser beams). The mirrors 117*b* and 118*b* move in a direction parallel to a plane of mirrors 117*b*, 118*b* minimising/eliminating any changes in a direction of the laser beams due to inaccuracies in the displacement of the mirrors 117*b*, 118*b* in this direction. The laser beams directed by each mirror pair is of a different wavelength. This enables the optical device to carry out spectroscopy with different wavelength excitation beams. In this way, the mirrors 116*a*, 116*b*; 117*a*, 117*b* and 118*a*, 118*b* together with any other optics in the common optical path form laser beam delivery optical trains for delivering excitation light from a laser to the collection optic such that the excitation light is incident on the sample.

Light collected by the collection optic 101*a* is directed back down the common optical path and to mirrors 116*a*, 116*b*; 117*a*, 117*b* or 118*a*, 118*b* (which pair of mirrors depending on whether mirrors 117*b* and 118*b* are in the mirror path). The mirrors 116*a*, 116*b*; 117*a*, 117*b* or 118*a*, 118*b* direct the light to the Raman probe 131*a*, 131*b*, 131*c*, which couples the light into the corresponding optical fibre 120*a*, 120*b*, 120*c*. The optical fibres 120*a*, 120*b*, 120*c* can be connected to a Raman spectrometer (not shown) for carrying out analysis of the Raman spectra of the light. Accordingly, analysis of the spectrum of the light is carried out off the optical apparatus 100.

Each Raman probe 131*a*, 131*b*, 131*c* collimates an excitation laser beam delivered via fibre optic 132*a*, 132*b*, 132*c* and directs the collimated laser beam to the corresponding optical train. Furthermore, each Raman probe 131*a*, 131*b*, 131*c* couples the light received from the optical train into fibre optic 120*a*, 120*b*, 120*c*.

The mirror box also houses a beam splitter 119 (shown in FIGS. 3 and 4) which allows the laser beams to pass therethrough but reflects broad spectrum light used for imaging of the sample. The optical apparatus comprises incoherent, broadband light generated by LED light source 110, which creates a wide beam of light. The light from light source 110 is directed via mirrors 111 and the beam splitter 119 along the common optical path. The mirror box further comprises a photodetector array, in this embodiment in the form of a CCD camera 140, for imaging light reflected from the sample, the light reaching the CCD camera 140 via beam splitter 119 and mirrors 111. In this way, the beam splitter 119 and mirrors 111 together with any other optics in the common optical path form a broadband light delivery optical train for delivering illuminating light from a broadband light source to the collection optic 101*b* such that the light is incident on the sample and an imaging optical train for delivering light reflected from the sample to a photodetector, in this embodiment the CCD.

In this embodiment, the collection optics comprises a parabolic mirror 101*a* for directing the exciting laser light for generating Raman spectra onto a sample in the sample chamber and for directing Raman light emitted from the sample back along the common optical path. The collection optics further comprises a planar mirror 101*b* and a lens 101*c* for directing the illuminating light on to the sample and directing light reflected from the sample to the camera. The optics 101*a*, 101*b*, 101*c* are mounted within holder 104. The collection optic 101*a* is mounted along a different optical path 121*a* of the holder 104 to the optical path 121*b* along which collection optics 101*b*, 101*c* are mounted. In this embodiment, the optical paths 121*a*, 121*b* of the holder 104 join at an end distal from the end collection optics 101*a*, 101*b*. The holder 104 is mounted to the arm 102 such that the holder 104 can rotate about an axis B-B to two positions defined by stops (not shown). In one position the optical path 121*a*, including collection optic 101*a*, is aligned with the common optical path and in the other position the optical path 121*b*, including lens 101*c* and collection optic 101*b*, is aligned with the common optical path.

Movement of the holder 104 is activated by an actuator 122 is located outside the sample chamber when, in use, the holder 104 is located in the sample chamber. A transmission linkage 123 transmits movement of the actuator 122 to the holder 104. The transmission linkage 123 comprises a hooked end portion 124 connected to the holder 104. Rotation of the transmission linkage 123 along its longitudinal axis causes the hooked end portion 124 to move the holder 104 between a position in which collection optic 101*a* is aligned with the common optical path to a position in which collection optic 101*b* is aligned with the common optical path against the biasing of spring 125. In this embodiment, spring 125 is a planar spring having an "isle of man" construction with three legs extending generally circumferentially and radially outwardly from a centre located on the rotational axis of the holder 104. The location of the stops can be adjusted, in this embodiment via adjustment screws 126*a*, 126*b*.

Thus, the holder 104, actuator 122, transmission linkage 123 and spring 125 act as an optic interchange device for changing the collection optic 101*a*, 101*b* in the common optical path. The collection optic 101*a*, 101*b* located in the common optical path is dependent on the type of imaging that is to be carried out, Raman imaging/mapping using the parabolic mirror 101*a* or visible light imaging using planar mirror 101*b*.

Attached to the arm 102 and partially surrounding but separate from the holder 104 is a collision guard 133. The collision guard 133 and holder 104 comprise electronic contacts that, in use, are normally spaced apart. However, the collision guard 133 is flexible such that if the collision guard 133 comes into contact with an element within the sample chamber, the collision guide will flex allowing the electronic contacts to make electrical contact. The closing of the electrical contacts causes an alarm, such as a buzzer, to be activated and stops further movement of the arm 102.

The optical apparatus comprises a pressure sensor 129 for measuring the pressure in the bellows 108 and a light source control system 130 configured to switch the laser off if the measured pressure in the bellows 108 deviates above a pre-set operating pressure.

It will be understood that alterations and modifications can be made to the above-described embodiment without departing from the scope of the invention as defined herein.

The invention claimed is:

1. An optical apparatus for use with an analytical apparatus arranged to project an analysis beam along an analytical axis towards a sample within a sample chamber, the optical apparatus comprising:

a collection optic mounted on an arm, the arm being insertable or inserted into the sample chamber through a port in the sample chamber to locate the collection optic for directing light scattered or generated from a point on the sample out of the sample chamber; and a drive mechanism comprising:

translation stages for moving the collection optic within the sample chamber in at least two transverse directions;

a drive control system configured to control movement of the translation stages; and encoders for measuring a position of each translation stage, the drive control system being configured to control movement of the translation stages to carry out a spectroscopic mapping of the sample based on feedback from the encoders, wherein the drive mechanism is arranged such that, when the arm is inserted into the sample chamber to locate the collection optic for directing the light out of the sample chamber, the translation stages are located external to the sample chamber.

2. The optical apparatus according to claim 1, comprising a delivery optical train for delivering illumination or excitation light from a light source to the collection optic such that the illumination or excitation light is incident on the sample.

3. The optical apparatus according to claim 2, comprising a plurality of delivery optical trains, each delivery optical train for delivering light from a different light source to the collection optic or a corresponding collection optic.

4. The optical apparatus according to claim 3, comprising at least two collection optics, one for directing laser light on to the sample and another for directing incoherent light onto the sample.

5. The optical apparatus according to claim 3, wherein the delivery optical trains are arranged to direct light from each light source along a common optical path.

6. The optical apparatus according to claim 5, wherein the common optical path includes an optical path along the arm.

7. The optical apparatus according to claim 5, comprising a collection optic interchange device for changing the collection optic in the common optical path.

8. The optical apparatus according to claim 7, wherein the collection optic interchange device comprises a holder on which the collection optics are mounted, the holder arranged to be movable relative to the optical path to locate each collection optic in the common optical path.

9. The optical apparatus according to claim 8, wherein the holder is mounted to the arm.

10. The optical apparatus according to claim 9, wherein the holder is rotatably mounted on the arm such that the holder can be rotated to a plurality of different positions, each position corresponding to a different collection optic being located in the common optical path.

11. The optical apparatus according to claim 8, wherein the collection optic interchange device comprises an actuator for moving the holder, the actuator being arranged at a location in the optical apparatus such that the actuator is located outside the sample chamber when, in use, the holder is located in the sample chamber, and a transmission linkage for transmitting movement of the actuator outside the sample chamber to movement of the holder within the sample chamber.

12. The optical apparatus according to claim 1, comprising a sealing element for sealing the port, the sealing element comprising a window, wherein the arm is insertable or inserted into the sample chamber to locate the collection optic for directing light scattered or generated from the point on the sample out of the sample chamber through the window.

13. The optical apparatus according to claim 1, wherein the drive mechanism comprises actuators for actuating movement of the collection optic in the at least two transverse directions, the actuators arranged such that, when the arm is inserted into the sample chamber to locate the collection optic for directing the light, the actuators are located external to the sample chamber.

14. The optical apparatus according to claim 1, wherein the drive mechanism is arranged such that when the arm is inserted into the sample chamber to locate the collection optic for directing the light, the collection optic is movable in two orthogonal directions substantially perpendicular to the analytical axis.

15. The optical apparatus according to claim 1, wherein the drive mechanism is arranged to move the arm, wherein movement of the arm causes movement of the collection optic.

16. The optical apparatus according to claim 15, wherein the drive mechanism is arranged to move the arm in at least two orthogonal directions.

17. The optical apparatus according to claim 1, wherein the drive mechanism comprises a first linear axis substantially parallel to a longitudinal axis of the arm, and a first range of movement along the first linear axis is sufficient to withdraw the collection optic out of a path of the analytical beam.

18. The optical apparatus according to claim 17, wherein the drive mechanism comprises a second linear axis transverse to the first linear axis, and the first range of movement along the first linear axis is greater than a second range of movement along the second linear axis.

19. The optical apparatus according to claim 18, wherein the drive mechanism comprises a third linear axis transverse to the first and second linear axes, and the first range of movement along the first linear axis is greater than a third range of movement along the third linear axis.

20. The optical apparatus according to claim 1, comprising a flange for sealing a port to the sample chamber through which the arm is inserted, the flange comprising an aperture through which the light is directed by the collection optic and the arm is mounted to be movable relative to the flange within the aperture in the at least two transverse directions.

21. The optical apparatus according to claim 1, wherein the drive control system is configured to limit movement of the arm to a specified range, the drive control system being programmable to adjust the specified range.

22. The optical apparatus according to claim 21, wherein the drive control system is configured to limit an extent of movement of the arm based on the specified range and position measurements generated by the encoders.

23. The optical apparatus according to claim 1, comprising a brake for holding the drive mechanism against forces on the arm resulting from a difference in pressure between the atmosphere within the sample chamber and atmosphere external to the sample chamber, wherein the brake is on when no power is applied.

24. An optical apparatus for use with an analytical apparatus arranged to project an analysis beam along an analytical axis towards a sample within a sample chamber, the optical apparatus comprising:

- a collection optic mounted on an arm, the arm being insertable or inserted into the sample chamber through a port in the sample chamber to locate the collection optic for directing light scattered or generated from a point on the sample out of the sample chamber;
- a drive mechanism comprising at least one translation stage for moving the collection optic within the sample chamber
- a pressure sensor for measuring pressure in the sample chamber; and
- a light source control system configured to cause at least one light source to be switched off if the measured pressure in the sample chamber deviates from a pre-set operating pressure.

25. The optical apparatus according to claim 24, wherein the at least one light source comprises a laser.

26. A method of collecting light scattered or generated from a sample in a sample chamber of an analytical apparatus, the analytical apparatus arranged to project an analysis beam along an analytical axis towards the sample within a vacuum in the sample chamber, the method comprising:

- providing (i) a collection optic for directing light scattered or generated from a point on the sample out of the sample chamber and (ii) a drive mechanism comprising:
  - translation stages for moving the collection optic within the sample chamber in at least two transverse directions;
  - one or more actuators external to the sample chamber for moving the translation stages; and
  - encoders for measuring a position of each translation stage; and
- spectroscopically mapping the sample by operating the one or more actuators to move the collection optic within the sample chamber such that the collection optic directs light from different points on the sample for each of a plurality of positions of the collection optic in the sample chamber, wherein the movement of the translation stages is controlled based on feedback from the encoders.

* * * * *